United States Patent
Kim et al.

(10) Patent No.: US 7,085,899 B2
(45) Date of Patent: Aug. 1, 2006

(54) SYSTEM AND METHOD OF AN EFFICIENT SNAPSHOT FOR SHARED LARGE STORAGE

(75) Inventors: Young Ho Kim, Taejon (KR); Dong Jae Kang, Taejon (KR); Yu Hyeon Bak, Taejon (KR); Chang Soo Kim, Taejon (KR); Bum Joo Shin, Taejon (KR); Myung Joon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 268 days.

(21) Appl. No.: 10/612,000

(22) Filed: Jul. 3, 2003

(65) Prior Publication Data

US 2004/0083345 A1    Apr. 29, 2004

(30) Foreign Application Priority Data

Oct. 24, 2002    (KR)    ............... 10-2002-0065126

(51) Int. Cl.
*G06F 12/00*    (2006.01)
(52) U.S. Cl. .................. 711/161; 711/162; 711/114
(58) Field of Classification Search .............. None
See application file for complete search history.

(56) References Cited

U.S. PATENT DOCUMENTS

| 6,101,585 | A  | * | 8/2000  | Brown et al. ............. 711/162 |
| 6,131,148 | A  |   | 10/2000 | West et al. |
| 6,341,341 | B1 | * | 1/2002  | Grummon et al. ......... 711/162 |
| 6,594,744 | B1 | * | 7/2003  | Humlicek et al. ......... 711/162 |
| 6,915,397 | B1 | * | 7/2005  | Lubbers et al. ........... 711/162 |

OTHER PUBLICATIONS

Suresh B. Siddha, et al.; "*A Persistent Snapshot Device Driver for Linux*"; IP20030063.

* cited by examiner

*Primary Examiner*—Mano Padmanabhan
*Assistant Examiner*—Craig E Walter
(74) *Attorney, Agent, or Firm*—Mayer, Brown, Rowe & Maw LLP

(57) ABSTRACT

An efficient snapshot technique based on a mapping for a large logical volume shared in multiple hosts. According to the present invention, problems of time delays in a conventional snapshot technique is solved by employing a FAB and an SSB, which are bits representing whether a COW operation is carried out to a mapping entry. In other words, the present invention solves the problems of delaying a write operation of corresponding volume, which is simultaneously executed when a snapshot is created, until the snapshot creation is completed.

3 Claims, 5 Drawing Sheets

Mapping Table

SYSTEM AND METHOD OF AN EFFICIENT SNAPSHOT FOR SHARED LARGE STORAGE

BACKGROUND OF THE INVENTION

1. Field of the Invention

The present invention relates to a snapshot technique for a shared storage supporting large capacity, and more particularly, to a snapshot technique which supports an on-line backup for a large logical volume based on a storage area network (SAN).

2. Discussion of the Related Art

In recent years, as technical developments of Internet-based application such as an electronic commerce and the like are made and users of Internet are rapidly spreading, a quantity of data in service increases exponentially. For this reason, there are demands for large network storage which can effectively share a large quantity of information and provide service at high speed.

As an example of technologies for implementing the large network storage, a network attached storage (NAS) and a storage area network (SAN) have been proposed. The SAN is a data file-oriented computer system environment which can directly access to a storage connected to a network, not via a server.

In the meantime, enterprise systems that must support 24×7×365 environment require data availability and reliability as well as high-speed processing of large-sized data. Among several methods of ensuring the reliability and availability, one method that can meet the requirements of these systems is an on-line backup whose importance has been stressed. A backup execution time increases exponentially in order for a backup of a large-sized data. Therefore, it is essential to provide an on-line snapshot based on a mapping table, since a system which stops its operation in order to execute the backup and then resumes its service is not useful. Here, the snapshot is a technique for storing and retaining data state at specific time when a user wants. The snapshot is a useful technique for the on-line backup and the like.

The snapshot technique copies only data image, not entire data, and retains data obtained at the moment the snapshot is created. If data block is modified after the snapshot is created, a new block is allocated, and then, the data at the moment of the snapshot is copied. Thereafter, mapping entry values are changed so as to map a data block which is newly allocated. In other words, a copy-on-write (COW) operation is performed in order to retain the data obtained at the time of the snapshot creation.

However, when the snapshot creation request is carried out in the on-line snapshot based on a conventional mapping table, a service cannot be processed because all hosts' access to an original volume is disconnected while copying the snapshot mapping table. As a size of the volume becomes larger, the mapping table increases. As a result, I/O access protection time also increases proportionally.

In addition, the write operation of data block occurring after the COW operation requires many disk I/O operations, thereby degrading I/O performance of the volume. At a snapshot destruction operation, in order for the deallocation of the data block allocated by the COW operation, it is checked whether the data block of the original volume and the data block of snapshot volume are updated or not, and the newly allocated data block should be deallocated, thus increasing the snapshot destruction execution time.

SUMMARY OF THE INVENTION

The present invention is directed to a snapshot technique for shared storage that substantially obviates one or more problems due to limitations and disadvantages of the related art.

An object of the present invention is to provide an improved snapshot method which supports an on-line backup for large logical volume based on a storage area network (SAN) providing a shared storage supporting large capacity.

According to the present invention, performance of the write operation is improved by omitting a read operation to a snapshot mapping block which is required for a determination of COW in case of a write operation and a snapshot destruction operation by adding information such as FAB and SSB into a mapping entry.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of creating a snapshot for on-line backup in a network storage based on a storage area network (SAN), which comprises the steps of: changing an volume operation mode of all nodes, in which a mapping server exists, into a snapshot create mode; locking a mapping block by increasing a value of the mapping block by one; if the mapping block is not locked, increasing a value of a copy-completed block by one; unlocking the mapping block; and if the copy of all the mapping blocks is completed, generating a volume configuration information for the snapshot at an original volume.

According to another aspect of the present invention, it provides a method of destroying a snapshot for a shared storage supporting large capacity based on a storage area network (SAN), which comprises the steps of: changing an volume operation mode of all nodes, in which a mapping server exists, into a snapshot destroy mode; locking a mapping block by increasing a value of the mapping block by one; determine whether or not a copy-on-write (COW) operation is carried out to a data block, which is indicated by a mapping entry, by using a first allocation bit (FAB) and a snapshot status bit (SSB); if the COW operation is carried out, initializing the FAB and the SSB, and writing the modified mapping block onto a disk; unlocking the mapping block; and if an initialization to all the mapping blocks is completed, destroying a snapshot volume.

It is to be understood that both the foregoing general description and the following detailed description of the present invention are exemplary and explanatory and are intended to provide further explanation of the invention as claimed.

BRIEF DESCRIPTION OF THE DRAWINGS

The appending drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the appending drawings.

Figure 1:
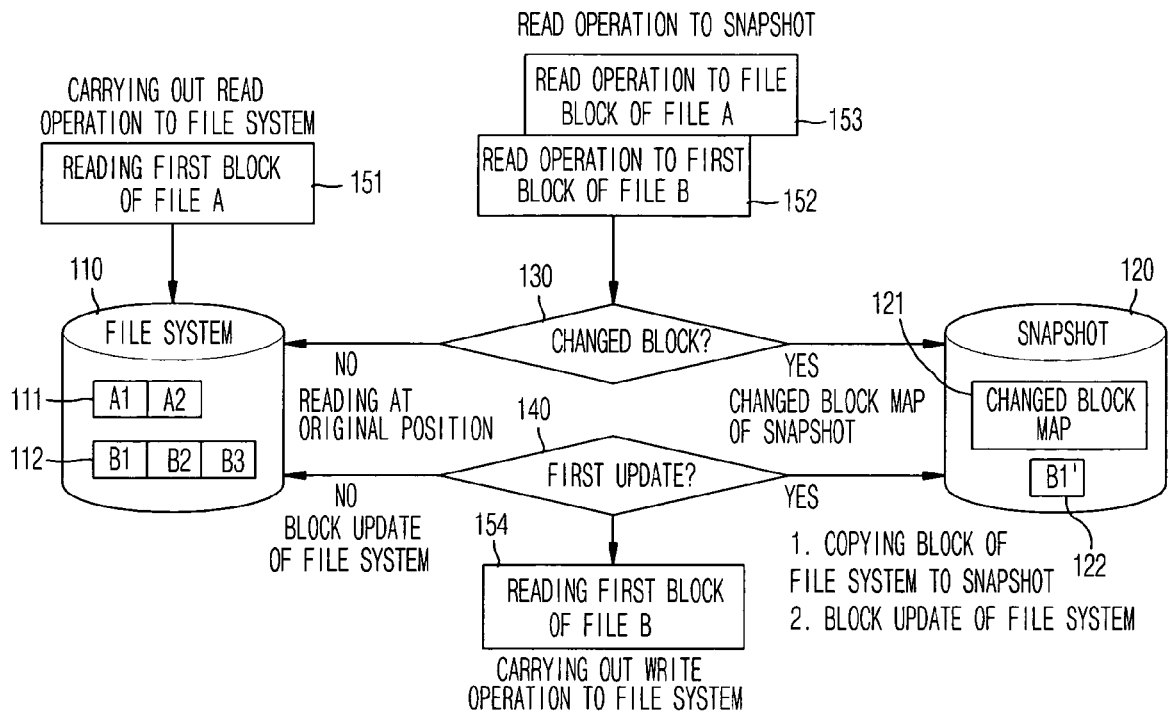
FIG. 1 illustrates sequential operations of copy-on-write (COW) in a general snapshot technique.

FIG. 1 illustrates sequential operations of copy-on-write (COW) in a general snapshot technique.

Referring to FIG. 1, a reference numeral "110" represents a file system having the latest data, and a reference numeral "120" represents a snapshot area storing data which is necessary to retain the modified data block after the snapshot is created. A file A 111 and a file B 112 are stored in the file system 110. The file A 111 consists of blocks A1 and A2, and the file B 112 consists of blocks B1 to B3.

In such a structure, if a request for reading the first block of the file A 111 is sent from a application before the snapshot is created (151), the file A 111 is read out from the disk 110 to thereby provide a service.

If a request for writing the first block of the file B 112 is occurred after the snapshot is created (154), the process proceeds to a step (140) of checking whether it is a first update or not. If the write operation to the first block of the file B 112 is the first update, the first block B1 of the file B 112 stored in the file system 110 is copied (B1':112) to the snapshot area 120 and its information is recorded on the changed block map 121. Then, contents to be actually updated are recorded on the first block B1 of the file B 112 stored in the file system 110. If the write operation is not the first update, the contents are directly written on the first block B1.

In a read operation to the snapshot, it is necessary to perform a step (130) of checking whether the block is changed or not. As the check result, if not changed, data of file system 110 is directly read out. Meanwhile, if changed, a physical position 122 of the changed block is searched by carrying out an examination of the changed block map 121 of the snapshot area 120, thus reading out data. In other words, if it is a reading (153) of the first block A1 of the file A, it is the unchanged block. Therefore, "A1" of the file system 110 is read out. If it is a reading (152) of the first block B1 of file B, it is the changed block, so that "B1'" of the snapshot area is read out.

Figure 2:
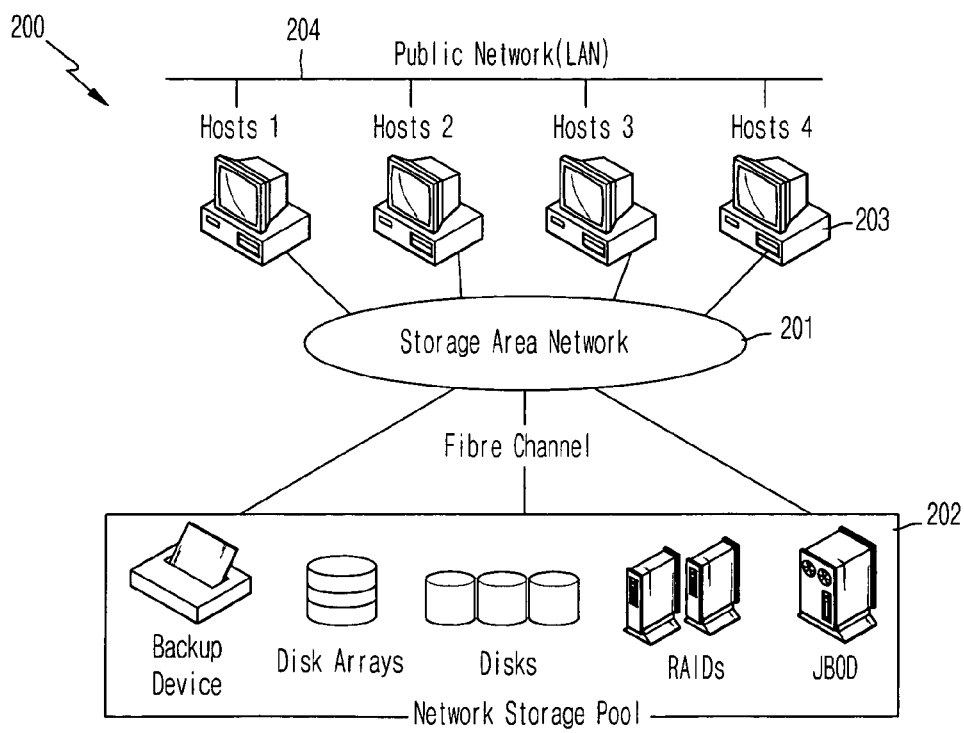
FIG. 2 is a view of a computer system configuration according to the present invention.

FIG. 2 is a view of a system configuration showing a physical environment for a logical volume manager (LVM) according to the present invention.

The LVM is a shared storage cluster system providing a storage sharing via the SAN under a multi-host environment. As shown in FIG. 2, the SAN environment 200 which is the basis of the LVM is generally provided with three parts.

Referring to FIG. 2, the SAN environment 200 includes a network storage pool 202 for storing and retaining data, a plurality of hosts 203 for sharing and accessing to the storage devices in order to provide service to users, and a plurality of switches 201 which is a storage area network for connecting the storage devices and the hosts 203 via a fibre channel (FC). Each of the hosts 203 uses a host bus adaptor (HBA) for connection with the switches 201. Also, the hosts 203 and the switches 201 are connected through the fibre channel (FC). Each of the hosts is connected through a local access network (LAN) 204 in order to process control/management information. If such a physical environment is prepared, an environment capable of utilizing the LVM is provided.

Figure 3:
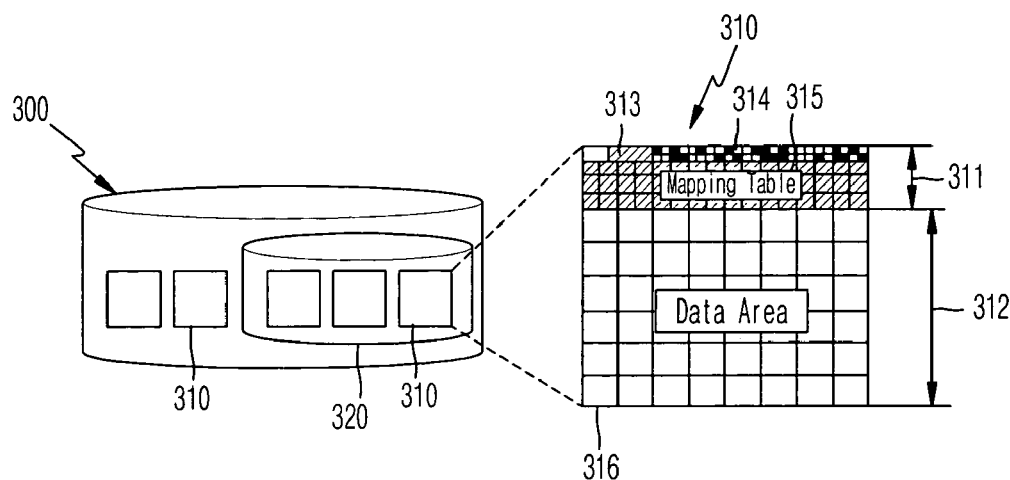
FIG. 3 is a view of a hierarchical structure of logical volume configuring a shared storage according to the present invention.

FIG. 3 is a view of a hierarchical structure of the mapping table based logical volume provided by the large logical volume manager, which is used in the computer system according to the present invention. The logical volume is generated from a storage pool 300 which is provided to the hosts shared via the SAN. The Logical Volume 320 according to the present invention is abstracted into three parts.

A first abstraction is a disk partition or a physical partition 310. The disk partition is generated by a tool which is generally provided from an operating system, and it is a minimum configuration unit.

In other words, more than one disk partition 310 is gathered to form one logical volume. A size of the logical volume is changed based on the disk partition unit. The disk partition 310 of the volume is generally provided with a volume header area 311 and a data area 312 storing actual data. In addition, the volume header area 311 is constituted with a volume configuration information area 313, an allocation bitmap table 314, and a mapping table 315.

A second abstraction is a physical volume 320. The physical volume 320 is named after a group of extendable disk partitions 310 and forms a continuous address space. A size of the physical volume 320 is changeable in a system operation, and it is a group of the disk partition 310 having the same volume configuration information 313. A type of the volume configuration information described by the user is generated at the physical partition 310 configuring the physical volume 320. The physical volume 320 includes a volume identification (ID) which is a single identifier for distinguishing it from others within the storage pool 300 shared by all the hosts.

A last abstraction is an extent 316. The extent 316 is a group of physically continuous blocks having the same size. In addition, the extent 316 is a minimum unit of the disk space which is allocable in order to store information.

A size of the extent 316 is equal with respect to one logical volume and determined when creating the logical volume. Different logical volumes can have different extents 316 in size and their sizes should be an exponential series of 2 and a multiple of the size of hard sector, i.e., the minimum unit of the physical disk 310.

After the disk partition 310 is generated by a tool provided in the operating system, the logical volume is defined with respect to several disk partitions. At this time, information necessary for the volume configuration is also provided. The information includes disk specific information such as capacity, # of extent, mapping table size, etc and volume information such as volume name, RAID information, and the like.

The LVM creates and writes the meta data of the volume configuration onto the corresponding physical disk partition header 311 according to the user definition of the volume to be generated as above. If the recording of the configuration information in the volume header area 311 of all the disk partitions is completed, the physical volume 320 is generated and the generated physical volume 320 is registered and used in all the shared hosts.

Figure 4:
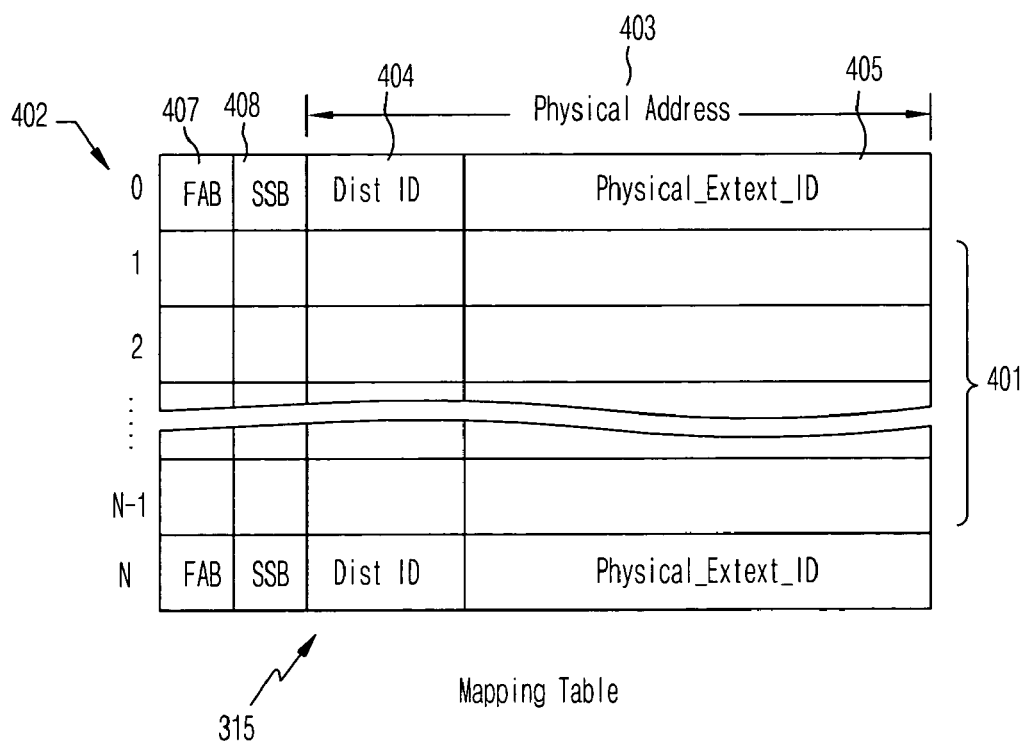
FIG. 4 illustrates a structure of mapping table and mapping entry according to the present invention.

FIG. 4 illustrates a structure of a mapping entry 401 of the mapping table 315 supporting the configuration and the mapping table scheme of the physical disk for the snapshot according to the present invention.

The mapping performs a process of converting a logical address of the upper module into an actual physical address of the lower disk. In addition, an effective allocation and deallocation, and independence between the logical address 402 and the physical address 403 in the data block can be provided through the free space manager. A structure of each mapping entry 401 configuring the mapping table 315 is generally composed of three parts.

Each of the mapping entry 401 includes a first allocation bit (FAB) 407, a snapshot status bit (SSB) 408, and a physical address 403 of the physical disk block. The physical address 403 consists of an address (Disk_ID) 404 of the disk partition and an address (Physical_Extent_ID) 405 of the physical block.

When the data block is allocated actually by the free space manager, the physical address 403 of the mapping entry is changed to map the actual disk block. In the snapshot technique according to the present invention, the FAB 407 and the SSB 408 added to the mapping entry 401 is distinguished from a previous structure of the mapping entry.

The FAB 407 is allocated to a first bit of all the mapping entries 401 and then used. The FAB 407 is a bit for distinguishing the data blocks which is first allocated and used after the snapshot is created. After the snapshot is created, if the data block is allocated by the free space manager and used, a value of the FAB is changed to "1" and the mapping entry 401 is recorded on the disk.

The SSB 408 is a bit representing a status of the snapshot. If the SSB 408 is "1", it means that the COW operation is already carried out after the snapshot is created. If the SSB 408 is "0", it means an initial value or that the COW is not yet carried out. Since the SSB 408 is maintained at each mapping entry and allocated at each snapshot by one bit, bits are allocated as many as the maximum number of the snapshot. Both the FAB 407 and the SSB 408 are initialized to "0" during a mapping table initialization process among the process of generating the physical volume on the disk of the shared storage.

In general, in the conventional snapshot technique, both the original mapping entry and the snapshot mapping entry are read out and compared with the physical address in order to determine whether or not the data change operation should carry out the COW operation to the block which is used for the first time after the snapshot is created.

In other words, the disk I/O operation is carried out two times. In addition, the process of deallocating the COW execution block, which will be carried out when destroying the snapshot, a deallocation procedure of the data block should not be carried out to the block which is first allocated after the snapshot is created. By the determination, the general snapshot technique should carry out two times the disk I/O operation to the original mapping entry and the snapshot mapping entry.

However, once the process of reading the original mapping entry is carried out, the snapshot technique according to the present invention through the FAB on the original mapping entry can determine whether or not the COW operation is executed. The FAB 407 of the mapping entry is set to "1" with respect to the data block which is first allocated and used after the snapshot, and an operation of reflecting the mapping entry in the disk is carried out.

If the FAB is "1" in the process of determining whether or not the COW operation is carried out, the contents of the corresponding data block are changed and reflected to the change on the disk. If the FAB is "0" among the already allocated block, the determination operation is achieved using the SSB.

In the snapshot exists, the data block is classified into three cases according to their statuses.

The first case is a data block which is first allocated/used after the snapshot is created. The second case is a data block which is used before the snapshot and not changed after the snapshot. In other words, the second case is a data block to which the COW operation has not been carried out. The third case is a data block which is changed after the snapshot, i.e., a data block to which the COW has been carried out. A status of the data block which is changed after the creation of the snapshot is one of the three cases, and the COW is performed to only the second case if the change occurs.

Like the first case, among the data blocks of the volume, there may be data blocks which are not used before the snapshot creation and first allocated after the snapshot creation. If a write operation to these data blocks occurs, a new data block is allocated and a write operation on the disk is carried out.

However, the COW is not carried out since the blocks are not used before the snapshot. In other words, since the COW is not carried out, the SSB maintains an initial value "0" as it is. On the contrary, since the data block is in use from the second change and the SSB is "0", there is a problem of carrying out the COW operation.

In other words, since the snapshot technique according to the present invention does not perform additionally the disk access operation in order to read the snapshot mapping entry, it is impossible to distinguish the block which is first used after the snapshot creation from the block which is allocated before the snapshot creation and to which the COW is not carried out.

Accordingly, in addition to the SSB, an additional one bit (FAB) is provided to mark the data block which is first allocated/use after the snapshot is created. Further, the FAB is used to distinguish the block which is first used after the snapshot creation and the block which is allocated before the snapshot creation and to which the COW is not performed.

In other words, in the case of the block which is not used before the snapshot creation and first allocated after the snapshot creation (i.e., in the case of FAB="1"), the COW operation is not performed even when the SSB is "0".

1. Creation of Snapshot

In order to perform the process of creating the snapshot, first, I/O and access to the original volume which is the object of the creation of the snapshot should be blocked. The original volume has to be frozen until the creation of the snapshot is completed. This freezing ensures that the data on the disk is in a consistent state.

In the table-based mapping method, a mapping table for corresponding volume should exist in order to perform I/O operation to the volume. In other words, in order to perform the I/O operation to the snapshot volume, the mapping table for the snapshot volume should be created, and the mapping table creation operation to the snapshot volume is first carried out.

The size of the mapping table increases in proportion to that of the volume. If the size of the mapping table becomes larger, a time required to generate the mapping table for the snapshot volume is also increased. In the shared storage based on SAN environment, the volume requires several TB to several thousands or more TB in size, and it takes several tens seconds to several minutes to generate the snapshot for such a volume.

In other words, the hosts sharing and using all the volumes during that period stop their processing execution. However, the stopping of the execution for several tens seconds is not tolerable and thus the general snapshot creation method is not suitable for the shared storage based on SAN environment.

The present invention employs an operation mode concept of the volume in order to minimize a delay of I/O operation to the volume when creating the snapshot. The operation mode of the volume is divided into three modes, i.e., a "normal" mode, a "snapshot create" mode and a "snapshot destroy" mode. Like the conventional snapshot technique, the snapshot creation method according to the present invention copies the original mapping table, and creates the snapshot mapping table.

However, when copying the mapping table, this process is carried out simultaneously without blocking of the I/O operation to the original volume. At this time, the delay of the I/O operation occurs only while the operation mode of the volume registered in the host changes from the normal mode to the snapshot creation mode. This delay is only a very short time compared with a time taken to copy the mapping table. The time is so negligible that the general user cannot recognize it.

Figure 5:
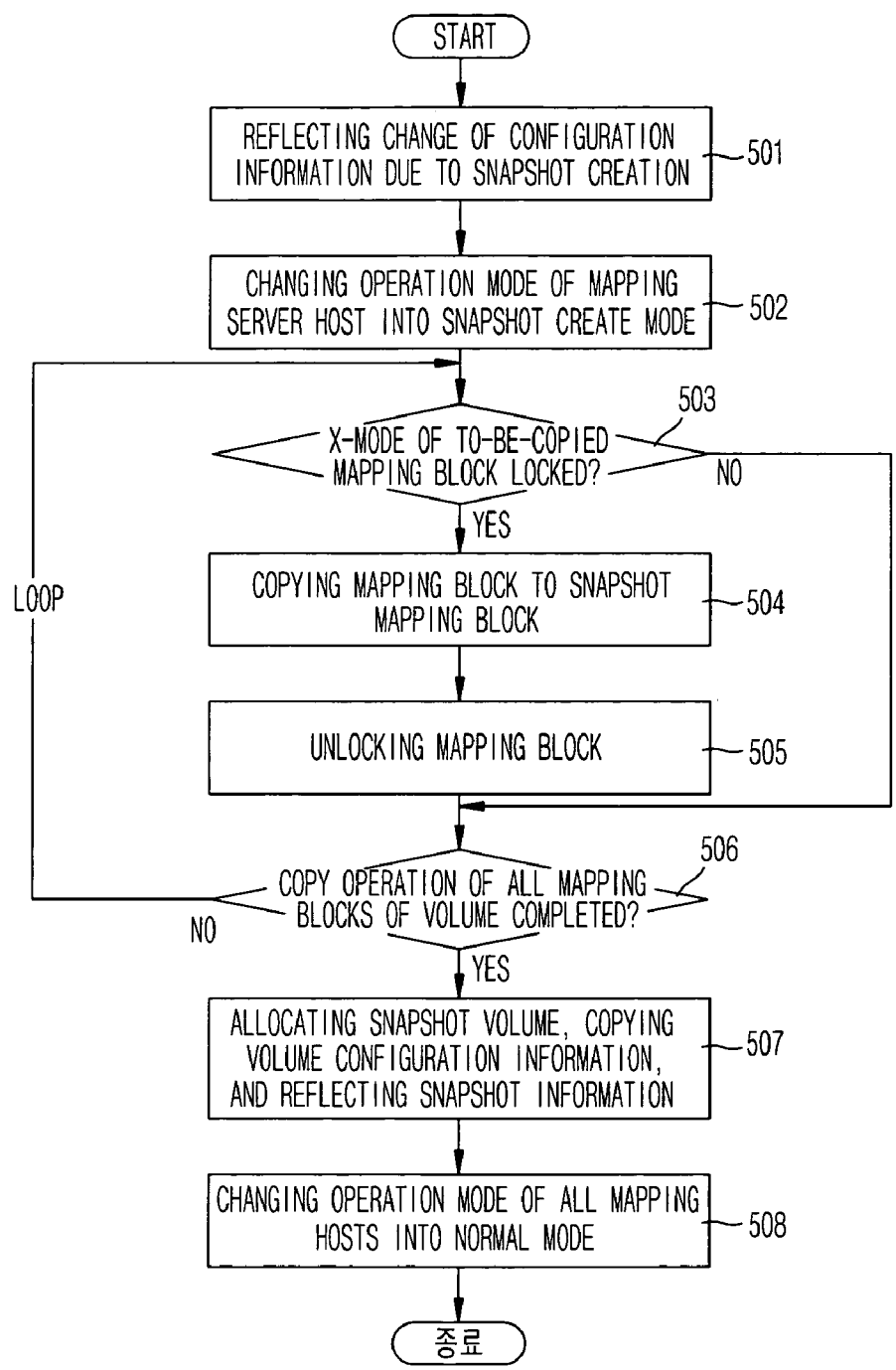
FIG. 5 is an operational flowchart illustrating a method of creating a snapshot for a shared large storage according to an embodiment of the present invention.

FIG. 5 is a flowchart illustrating the method of creating the snapshot according to the present invention. The method of creating the snapshot according to the present invention will be described below in detail with reference to FIG. 5.

First, a change of the configuration information on the original volume changed due to the creation of the snapshot is carried out (501). The information change in the number of the snapshot and the like is reflected in the registered volume. If the change of the configuration information is completed, the operation mode of the volume in a mapping server host changes from the normal mode to the snapshot creation mode until the snapshot creation is completed (502). In the snapshot creation mode, the access and I/O operation to the volume, which are performed by the general different processors, are carried out simultaneously while copying the mapping table.

Then, in order to copy all the blocks of the original mapping table to the snapshot mapping table, a lock of an exclusive mode for the initial mapping block with respect to all blocks is acquired (503), and a copy operation of the mapping block is carried out (504). If the lock is not acquired, it is examined whether or not the copy operation to all the mapping blocks is completed (506). The case of not acquiring the lock is that other processor performing the write operation to the same block already acquires and carries out the locking operation.

In this case, the copy operation to the corresponding mapping block is carried out by examining the operation mode of the volume in a write operation and carrying out the COW operation. If the lock is acquired, the original mapping block is copied to the snapshot mapping block (504) and the lock is released. (505).

Thereafter, it is examined whether or not the copy operation to all the mapping blocks of the original volume is completed (506). If not completed, the process returns to the step 503. If completed, a volume for the snapshot is allocated, the original volume configuration information is copied to the allocated volume, and information such as the snapshot name and snapshot sequence is reflected in the snapshot volume (507). If the creation of the snapshot volume is completed, the operation mode of the mapping server host is changed to the normal mode (508). By using the above manner, the creation of the snapshot is normally carried out without I/O interrupt of the application program accessing to the original volume.

2. Snapshot Destruction

Meanwhile, in the conventional snapshot technique, one factor causing degradation is an overhead accessing to the snapshot mapping block in order to determine the execution of the COW operation during the snapshot destruction operation. In the snapshot destruction operation, portion causing the overhead is a deallocation operation to the data block allocated by the COW operation.

In other words, in the conventional snapshot technique, in order to determine whether or not the COW operation is carried out, both the mapping entry and the snapshot mapping entry are read out and it is examined whether or not block addresses indicated by the two entries are identical to each other. If the addresses of the two physical blocks are identical to each other, the COW operation is not carried out to the corresponding data block and thus only the address of the mapping entry is initialized.

If not identical, the deallocation operation is carried out to the data block indicated by the snapshot mapping entry, and then the initialization of the mapping entry is carried out. If the number of the snapshot is more than one, mapping entries of other snapshots are also compared. In other words, an additional disk I/O operation should be carried out at least two times.

For solving the problem of the conventional snapshot destruction operation, which is caused due to the access to the snapshot mapping block when determining whether or not the deallocation of the block is carried out, the present invention proposes a method of introducing the SSB 408 and the FAB 407 into the original mapping entry. The value of the SSB 408 is initialized to "0" when the mapping block is initialized in an operation of generating the physical volume, and it is changed into "1" when the COW operation is carried out.

The snapshot technique according to the present invention can determine whether or not the COW operation is carried out only by reading out the mapping entry of the original volume without using the method of reading out the snapshot mapping entry and comparing it with the original mapping entry. In other words, as an examination result of the FAB 407, if the FAB 407 is "1", it is checked whether the snapshot to be destroyed is a first one or not. In case the FAB is "1" and the first snapshot, the deallocation is not carried out since the corresponding data block is a block which is first allocated and used after the snapshot is created. Except this case, the SSB value is examined.

If the SSB 408 of the position of the destroying snapshot is "0", it represents the case that the COW operation is not carried out. If the SSB 408 is "1", it represents the case that the COW operation is carried out. If the SSB 408 is "0", a next block is processed. If the SSB 408 is "1", it is checked whether the next snapshot exists or not. If the next snapshot exists, the SSB value of the next snapshot is examined.

If the next snapshot does not exist, or if the COW operation is carried out even though the next snapshot exists, the current data block is deallocated. In this case, when the next snapshot exists, the COW operation is determined using the SSB value, and whether to deallocate the current snapshot is determined. In other words, the snapshot technique according to the present invention can execute the snapshot destruction operation through the original mapping entry without reading out the value of the snapshot mapping entry.

In case there are several snapshots, the conventional snapshot technique should carry out the I/O operation of reading out the mapping entry as many as the snapshots. This operation is carried out by comparing the mapping entry of the next snapshot, except the current snapshot entry. However, the snapshot technique according to the present invention can execute all the processes by reading out only the original mapping entry without regard to the number of the snapshots. Consequently, as the number of the snapshots are larger, the performance of the destruction operation is enhanced much more.

Figure 6:
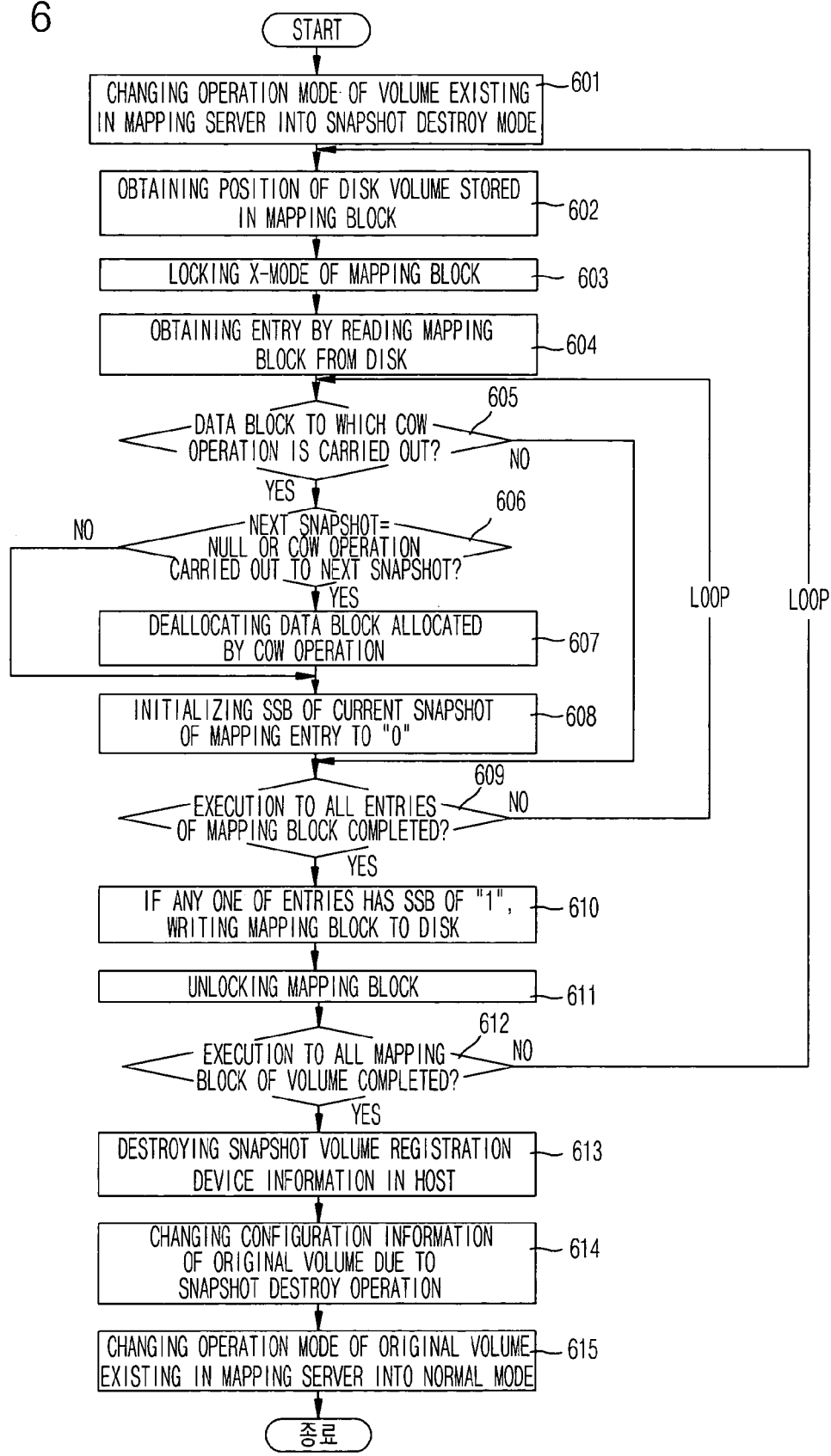
FIG. 6 is an operational flowchart illustrating a method of destroying a snapshot for a shared large storage according to an embodiment of the present invention.

FIG. 6 is a flowchart illustrating the method of destroying the snapshot according to the present invention. Hereinafter, the method of destroying the snapshot according to the present invention will be described below with reference to FIG. 6.

In the snapshot destruction operation, the data block allocated by the COW operation should be deallocated. Then, the snapshot volume is destroyed after destroying the mapping table for the snapshot.

If the snapshot destruction is requested, the volume operation mode of the mapping server is changed into the snapshot destroy mode (601). The change of the operation mode into the snapshot destroy mode is for the purpose of preventing the execution of the COW operation to the corresponding snapshot of the data block generated before the snapshot destruction operation is completed. The FAB 407 and the SSB 408 of the original mapping table entry are examined. In order to determine whether to deallocate the data block. Accordingly, the position of the disk block storing the original volume mapping entry is obtained (602) in order to read out the mapping entry for the access to the data block. The mapping entry is obtained by reading the mapping block from the disk block into the memory (603). The operation of examining the execution of the COW is carried out to all the entries of the mapping block in order.

Then, it is determined whether the COW operation is carried out using the FAB and SSB values of the mapping entry (604). If the COW for the data block which mapped by the mapping entry is not carried out, a procedure of examining the next mapping entry is carried out (609). If the COW for the data block has been carried out, a procedure of determining whether to deallocate the data block is carried out (606). The case of deallocating the data block of which the COW has been carried out is two. One is the case that the next snapshot does not exist, and the other is the case that the COW operation is carried out to the same data block after creating the snapshot when the next snapshot exists. In the above two cases, the data block should be deallocated (607), and the SSB value corresponding to the state bit value of the current snapshot of the mapping entry is initialized to "0" (608). In case that the data block is not deallocated, only the SSB value is initialized to "0". By doing so, the execution to one mapping entry is completed.

It is examined whether the executions to all the entries existing in the mapping block are completed (609). If not completed, the process repeats the steps 605 to 608 with respect to the next mapping entry. If completed, the operation of reflecting the mapping block in the disk is carried out when more than one COW operation occurs (610).

If the write operation to the mapping block is completed, the mapping block is unlocked (611). And then, it is examined whether the executions to all the mapping blocks are completed (612). If the mapping block to be executed exists, the process repeats the steps 602 to 611.

If the executions to all the mapping blocks are completed, an operation of destroying the snapshot volume from the host is carried out (613). If the snapshot volume is destroyed, an actual snapshot destruction execution is completed and an operation of reflecting the configuration information of the original volume to be changed due to the snapshot destruction operation is carried out (614). Finally, if the operation mode of the volume existing in the mapping server is changed into the normal mode (615), the snapshot destruction operation is completed.

3. Data Write Operation

The performance of the snapshot can be determined by evaluating how efficiently the write operation for the data block is performed when the data block is updated after the snapshot creation. The read operation of the snapshot mode is carried out in the same manner as that of the normal mode. In other words, the physical data block equal to the logical block is obtained through the mapping, and data is read out from the obtained physical data block.

When the snapshot exists, the operation causing the degradation of the performance is a write operation of reflecting the change of the data block. In the snapshot technique based on the mapping table, the write operation is carried out in two cases.

A first case is a data block which is not allocated/used before the creation of the snapshot and newly allocated/used after the creation of the snapshot. Since the snapshot volume maintains only the volume data image at the moment when the snapshot is created, it has no concern with the data used after the snapshot creation.

Without additional processes in the same manner as the write operation of the normal mode, the data used after the snapshot creation is allocated from the free space manager, the physical address of the data block is reflected in the mapping entry of the original volume, and the write operation of writing the change of the contents to the disk block is carried out.

A second case is a data block used before the snapshot creation and changed after the snapshot creation. The snapshot should maintain the volume data corresponding to the moment of the creation as it is. Therefore, the contents of the data used before the creation of the snapshot should be maintained even when the contents are updated. The above operation carried out in order to maintain the contents of the data block allocated before the snapshot is the copy-on-write (COW) operation.

The COW operation is an operation that should be carried out in the same manner in the snapshot technique based on the mapping table. A problem is the write operation for the data block allocated after the COW operation. The conventional snapshot technique determines whether the COW operation is carried out or not by reading out both the original mapping entry and the snapshot mapping entry and checking whether the addresses of the physical block mapped by the two entries are equal to each other.

In other words, the I/O operation to the snapshot mapping block is additionally necessary. If the number of the snapshots increases, the number of disk I/O operation also increases in proportion to the number of the snapshots. For example, if the number of the snapshots is two, the I/O operation is carried out two times, and if three, the I/O operation is carried out three times. By doing so, the performance of the write operation is degraded in proportional to the number of the existing snapshots.

The present invention solves the problem of the conventional write operation by using a following method. If the volume mode is the snapshot mode and the contents of the data block allocated/used before the snapshot is first changed after the snapshot creation, the value of the SSB is changed into "1".

In other words, the value of the SSB corresponding to the snapshot of the mapping entry of which the COW operation is carried out is changed into "1". If the write request for the same data block which COW is already performed is occurred, the determination of the COW operation is processed using the SSB of the mapping entry of the original volume. The snapshot technique according to the present invention can achieve the operation through the original volume mapping entry without accessing the snapshot mapping entry on the disk and comparing it with the original mapping entry.

As the number of the snapshots increases, the performance increases much more. The write operation carried out when the data block generated after the COW operation is changed has the same performance as the write operation of the normal mode.

Figure 7:
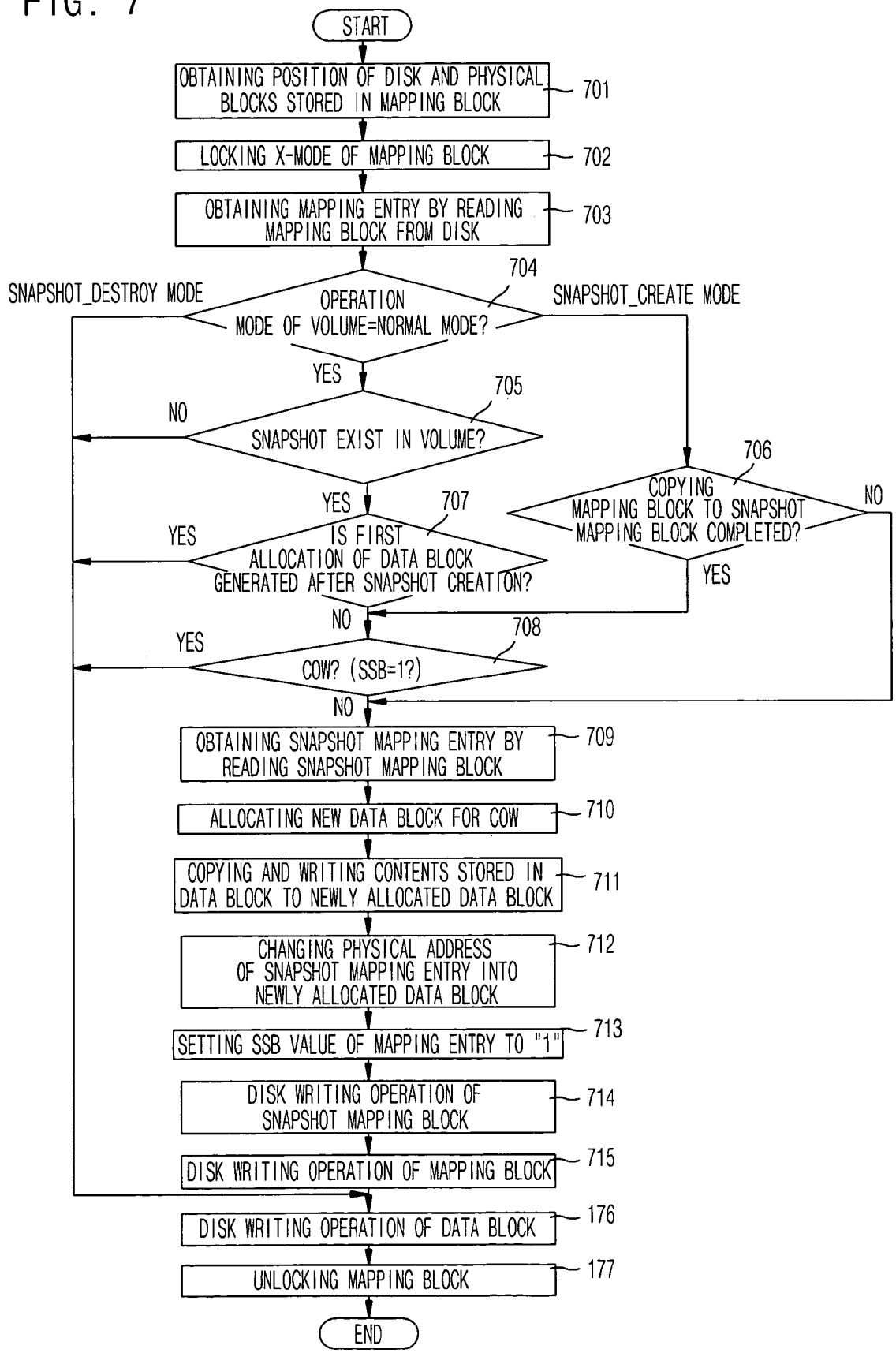
FIG. 7 is an operational flowchart illustrating a write operation for a shared large storage according to an embodiment of the present invention.

FIG. 7 is a flowchart illustrating the process of the I/O request according to the present invention, when the snapshot exists. If the I/O request to the volume occurs, the physical disk and the address of the mapping block storing the mapping information on the data block are obtained (701).

An exclusive lock mode for the mapping block is acquired (702). Then, the mapping block is read out from the disk into the buffer of the memory, and the mapping entry corresponding to the logical address is obtained (703). The operation mode of the volume is examined (704). In other words, it is examined whether or not the current I/O is generated during the creation or destruction of the snapshot.

If the operation mode of the volume is the normal mode NORMAL, it is examined whether the snapshot exists in the volume (705). If the snapshot does not exist in the volume, the data block is recorded in the disk like the general write operation (716). The lock for the mapping block is released (717). If the snapshot of the volume exists, it is examined whether or not the data block is used before the creation of the snapshot (707). The COW operation is not carried out to the data block allocated and used after the creation of the snapshot.

The updated contents are written on the disk of the data block (716), and the lock for the mapping block is released (717). If the data block is allocated before the snapshot creation, it is examined whether or not the COW operation is already carried out after the snapshot creation (708).

If the COW operation is already carried out, the data block is written on the disk (716), and the lock for the mapping block is released (717). If the COW operation is not yet carried out, the COW operation should be carried out. The snapshot mapping block corresponding to the same logical address as the original mapping block is read out into the buffer to thereby obtain the snapshot mapping entry (709), and a new physical data block is allocated in order to carry out the COW operation (710). Then, the contents of the data block are copied to the newly allocated data block, and the copied data block is written on the volume disk (711).

The physical address mapped by the snapshot mapping entry is modified with the address of the newly allocated data block (712), and the value of the SSB with respect to the current snapshot of the original mapping entry is changed into "1" (713). The snapshot mapping block is recorded in the disk (714). Then, the original mapping block is recorded in the disk (715). After the steps 709 to 715 of carrying out the COW operation, the contents of the data block are recorded in the disk (716), and the lock for the mapping block is released, thereby ending the operation (717).

If the operation mode of the volume is not the normal mode but the snapshot creation mode at the step 704, it is examined whether or not the copy operation is carried out to the mapping data block including the mapping entry (706). If the copy operation is completed, the value of the SSB is checked in order to determine whether the COW operation is carried out. If the value of the SSB is "1", it means that the COW operation is already carried out, so that the data block is recorded in the disk (716). Then, the process proceeds to the step 717.

If the value of the SSB is "0", the COW operation is carried out. After the steps 709 to 715 of carrying out the COW operation, the data block is recorded in the disk (716), and the locking of the mapping block is unlocked, thereby ending the operation (717). If the copy operation is not completed, the COW operation should be carried out. The operation is ended after carrying out the steps 709 to 717. If the COW operation is carried out, the copy operation is automatically carried out to the snapshot mapping block.

As described above, according to the efficient snapshot method for the shared large storage has advantages in that the application programs can be simultaneously executed during the operation of creating the snapshot in the shard storage supporting large capacity based on SAN environment. Further, the performance of the write operation occurring after the snapshot creation is enhanced, so that data availability and reliability are secured and the on-line backup is supported without the degradation of performance in an enterprise system requiring the high availability of 24×7×365, such as web server or electronic commerce.

The above descriptions are for a kind of embodiment to implement a data transfer protocol control system and method with a host bus interface according to the present invention. The present invention is not bounded to the embodiment. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system based on a storage array network (SAN), the system comprising:

a plurality of hosts configured to share a large network storage, and an original mapping table and a snapshot mapping table being stored in the same disk of a logical volume in the network storage, wherein a snapshot volume is added, and a data block is allocated on the same disk if a copy-on-write (COW) operation is carried out, and wherein a mapping entry of the original mapping table includes a physical data block information and a snapshot status information.

2. The system according to claim 1, wherein the snapshot status information of the mapping entry is a snapshot status bit (SSB) and a first allocation bit (FAB).

3. A storage array network (SAN) system comprising:
a plurality of hosts configured to share a large network storage;
an original mapping table stored in a disk of a logical volume in the network storage; and
a snapshot mapping table stored in the same disk of the logical volume in the network storage;
wherein a snapshot volume is added, and a data block is allocated on the same disk if a copy-on-write (COW) operation is carried out, and
wherein a mapping entry of the original mapping table includes a physical data block information and a snapshot status bit (SSB) and a first allocation bit (FAB).

* * * * *